Patented June 11, 1946

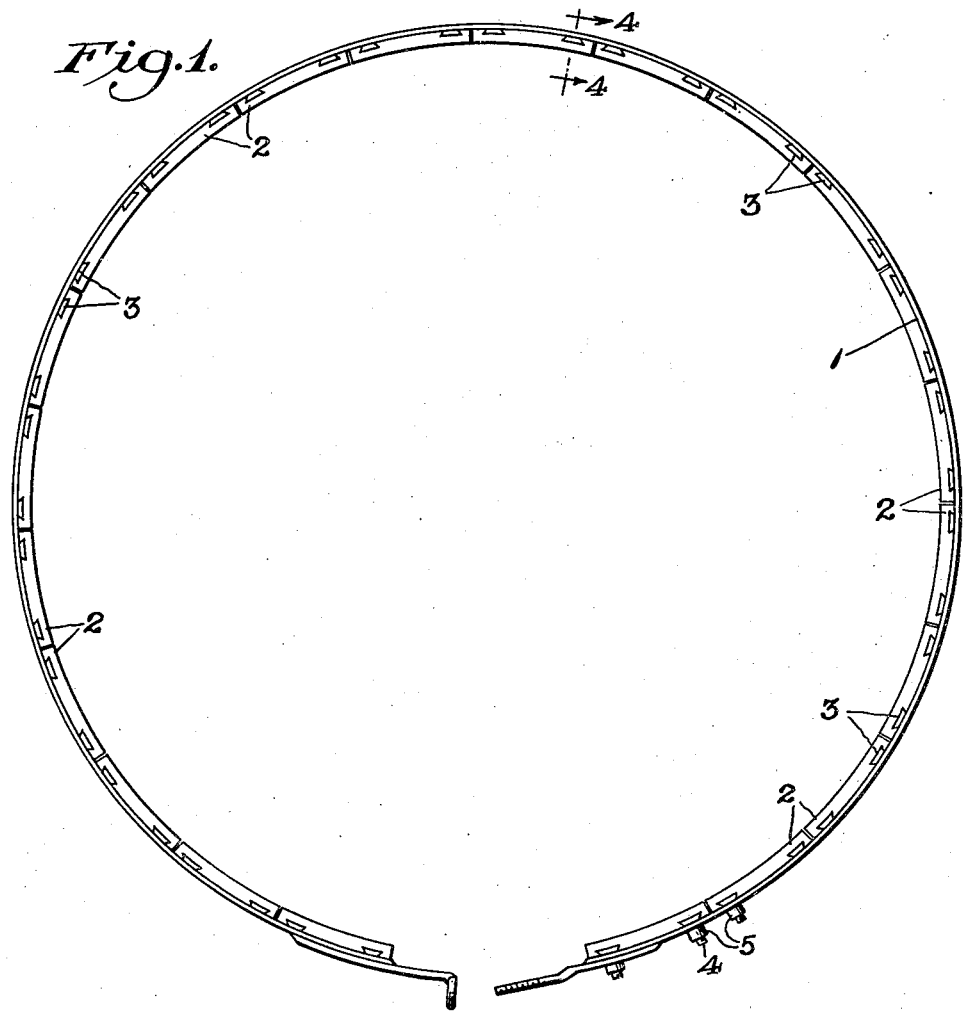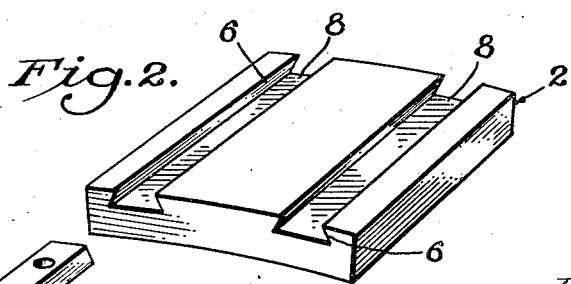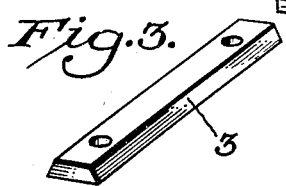

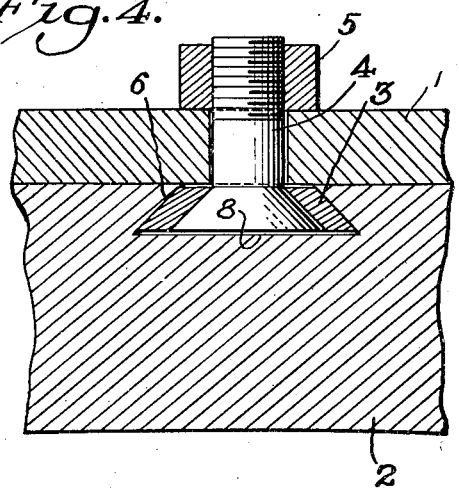
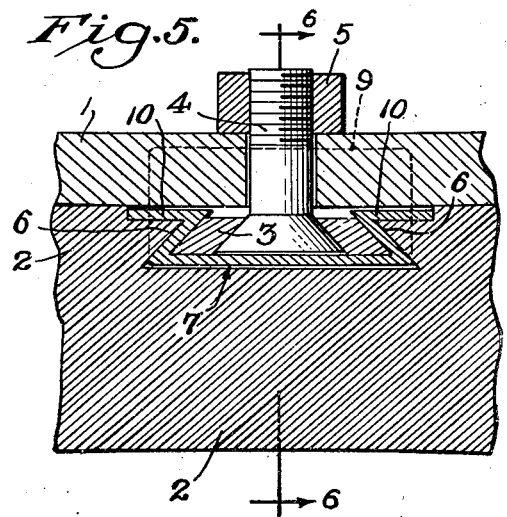
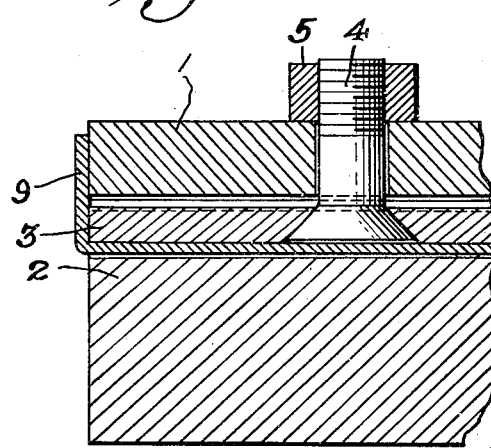
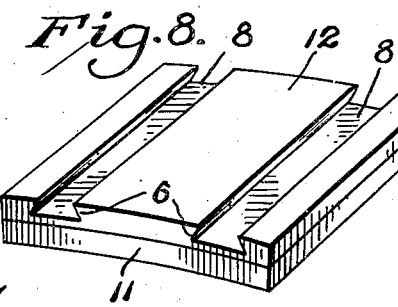
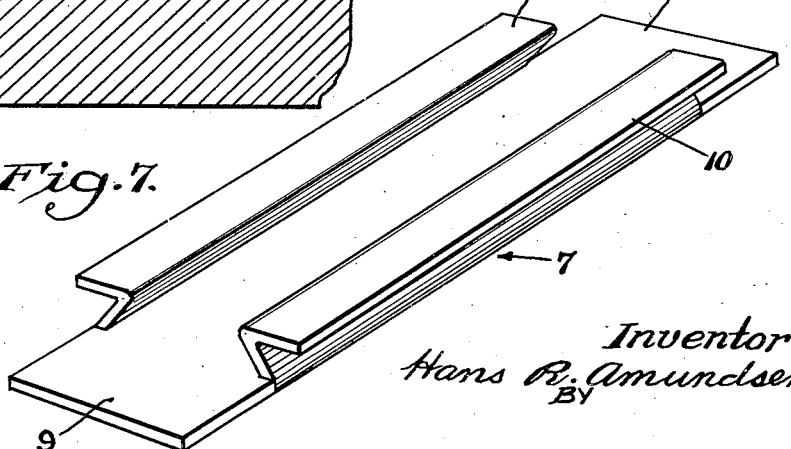

2,402,005

UNITED STATES PATENT OFFICE 2,402,005

FRICTION BRAKE OR CLUTCH

Hans R. Amundsen, Oak Park, Ill.

Application May 8, 1944, Serial No. 534,632

12 Claims. (Cl. 188—234)

My invention relates to friction brakes and clutches.

One of the objects of my invention is to provide an improved brake or clutch construction in which the brake or clutch blocks or linings are secured to the bands or other carriers without the use of bolts or rivets in the friction material and which will enable the removal and replacement of all or any number of brake blocks from the carrier without removing the band or carrier from its place in the machine.

A further object of my invention is to provide such a construction in which the connection and disconnection of the block with respect to the carrier is effected by providing shouldered slots in the block or in the metallic backing of the block which may be connected with shouldered guides attached to the carrier by bolts or suitable fastening devices.

A further object of my invention is to provide a construction as indicated above in which the shouldered guides may be used as clamping members to clamp the bearing blocks snugly between the guides and the band or carrier.

A further object of my invention is to provide such a construction in which means are provided for preventing lateral movement of the brake blocks with respect to the carrier.

A further object of my invention is to provide a construction as indicated above in which wear plates or the like are provided to prevent wear on the sides of the slots in the brake blocks.

A further object of my invention is to provide friction blocks of the character indicated above which can be used with the bands or carriers now in use without necessitating any changes in the carriers.

A further object of my invention is to provide a construction as indicated above in which there are no holes or recesses in the drum-engaging faces of the blocks which tend to collect abrasive foreign matter and which lessen the area of effective friction surface and the wearing action of the friction material.

A further object of my invention is to provide a construction as indicated above in which there are no bolts or rivets which would cut into the drum as the block wears.

While I have shown and described my invention in connection with an external band brake or clutch, it is obvious that it is applicable to internal as well as external brakes and clutches and to friction block carriers of types other than bands.

In the drawings, in which several forms of my invention are shown,

Figure 1 is a side elevational view showing a brake or clutch band construction;

Fig. 2 is a perspective view of one of the friction blocks;

Fig. 3 is a perspective view of one of the block-holding guiding and clamping strips;

Fig. 4 is an enlarged sectional view on the line 4—4 of Fig. 1;

Fig. 5 is an enlarged sectional view similar to Fig. 4 but showing an additional feature;

Fig. 6 is a section on the line 6—6 of Fig. 5;

Fig. 7 is a perspective view of the block-retaining and block-protecting plate used in Figs. 5 and 6; and Fig. 8 is a perspective view showing a different form of friction block.

In certain types of brake and clutch constructions now in use, the friction block carrier is formed from a circular strip of metal to the drum side of which are secured a number of circumferentially arranged friction blocks curved on one side to fit the band and on the other side to bear against the drum. Heretofore it has been common practice to provide a number of bolt holes in the band for each friction block, the blocks having countersunk recesses for the heads of the bolts. When this band was in position on the drum, the heads of these securing bolts were inaccessible. If a single block were worn out and had to be replaced, the whole band, carrying perhaps twenty or more friction blocks, had to be disconnected and slipped off from the drum to enable access to be had to the concealed bolt heads to enable the bolts to be removed. The invention disclosed herein avoids the necessity for removing the band from the drum in removing an individual friction block.

Referring to the drawings in detail, the construction shown comprises a brake or clutch band 1 which may be a steel band of the desired diameter, width and thickness, a plurality of friction blocks 2 secured inside the brake band, and a plurality of dovetail clamping and guide strips 3, two for each block, secured to the band by means of countersunk cone head bolts 4 and nuts 5. These dovetail strips 3 have a lateral sliding fit in correspondingly-shaped dovetail grooves in the blocks 2. With this construction, if a friction block is worn out or damaged so that it has to be removed, this can be done without removing the band from the drum, by forcing the block 2 to slide laterally along the strips 3 from between the band 1 and the drum. This enables a block to be removed and replaced quickly, thus avoiding shutting down the machine for a great length of time as is required when the entire band with the attached blocks has to be removed from the drum. The bolts 4 may, if desired, be secured to the strip 3 in any suitable manner, for example, by welding or brazing. As the nuts 5 are tightened up, they will draw the dovetail strip toward the band. This will clamp the tapering edge portion 6 of the block between the clamping strip and the inner face of the band 1.

In general, the friction between the block 2 and band 1 will prevent lateral slipping of the block. However, in order to prevent positively accidental lateral slipping of the blocks 2 along the strips, a sheet metal block-retaining and block-protecting clip or channel 7, such as shown in Figs. 5, 6 and 7, may be provided. This may be slipped into place in the dovetail groove 8 in the block before the brake block is slipped into place over the strips 3.

After the block 2 is in position with respect to the band 1, the ends 9 of the clip are bent up as shown in Figs. 5 and 6 so as to overlap the ends of tapering edge portions 6 of the block 2 and the side edges of the brake band, thus preventing lateral slip of the block. The upper flanges 10 of the clip 7 overlie portions of the block and prevent wearing and crushing of the tapering edge portions 6 of the block lying underneath these flanges. It is of interest that this anchorage strip 3 and the cooperating block 2 can be substituted for the blocks and anchorage means now in use, as the bolt holes in the band which are already provided are utilized to receive the bolts 4.

The friction block may be of any suitable material such as a composition including asbestos or the like. It may be made as a single integral block in which the grooves 8 are formed as shown in Figs. 1 to 6, incl., or it may be made in two parts as shown in Fig. 8, including a wear part 11 of suitable friction material having a curved friction surface and a backing plate 12 of metal or other suitable material secured to the friction material 11, as by fusing. The grooves 8 may be formed in the metal backing plate 12, for example by milling.

In the clip shown in Fig. 7, it is obvious that the upper flanges of the clip may be omitted, together with their wear resisting function, if desired, the clip then serving mainly to prevent side slip of the friction block.

The elimination of the enlarged bolt head receiving recesses in the friction blocks of the prior art construction may result in an increase of effective braking surface of as much as ten per cent and an increase of as much as twenty-five per cent in the amount of effective braking material in the friction block.

Further modifications will be apparent to those skilled in the art and it is desired, therefore, that the invention be limited only by the scope of the appended claims.

Having thus described my invention, what I claim and desire to secure by Letters Patent is:

1. A clutch or brake construction comprising a friction element having a curved friction surface for frictionally engaging a cooperating relatively movable friction surface to check relative rotation between said surfaces about a common axis, an element carrier to which said friction element is secured, movable to bring said friction surfaces into and out of engagement with each other, and means for guiding said element in assembly and detachably securing and clamping said element to said carrier comprising a guiding and clamping strip in length substantially equal to the width of the element secured to said carrier extending longitudinally of the axis of rotation and adjustable clamping means for drawing said strip toward said carrier, said strip and element having interengaging guiding and clamping shoulders extending longitudinally of the axis of rotation for guiding said element axially in attaching and detaching it with respect to the strip and for drawing said element toward said carrier and clamping it thereon when the adjustable clamping means are operated to draw said strip toward said carrier.

2. A clutch or brake construction comprising a plurality of friction elements, each having a curved friction surface for frictionally engaging a cooperating relatively movable friction surface to check relative rotation between said surfaces about a common axis, a band-like element carrier to which said friction elements are secured, movable to bring said friction surfaces into and out of engagement with each other, and means for guiding said element in assembly and detachably securing and clamping each element to said carrier comprising a guiding and clamping strip in length substantially equal to the width of the element secured to said carrier extending transversely of the carrier and adjustable clamping means for drawing said strip toward said carrier, said strip and element having interengaging guiding and clamping shoulders extending transversely of the carrier for guiding said element in attaching and detaching it with respect to one strip and for drawing said element toward said carrier and clamping it thereon when the adjustable clamping means are operated to draw said strip toward said carrier.

3. A clutch or brake construction comprising a friction element having a curved concave friction surface for frictionally engaging a cooperating relatively movable convex friction surface to check relative rotation between said surfaces about a common axis, an element carrier to which said friction element is secured, movable to bring said friction surfaces into and out of engagement with each other, and means for guiding said element in assembly and detachably securing and clamping said element to said carrier comprising a guiding and clamping strip in length substantially equal to the width of the element secured to said carrier extending longitudinally of the axis of rotation and adjustable clamping means for drawing said strip toward said carrier, said strip and element having interengaging guiding and clamping shoulders extending longitudinally of the axis of rotation for guiding said element axially in attaching and detaching it with respect to the strip and for drawing said element toward said carrier and clamping it thereon when the adjustable clamping means are operated to draw said strip toward said carrier.

4. An external band brake or clutch construction comprising a brake or clutch band expansible and contractible to vary its radius, a plurality of circumferentially-spaced friction blocks secured to the inside of the band for bearing on the brake or clutch drum, each friction block having one or more dovetail-like grooves in its outer face extending transversely of the band, one or more dovetail-like guiding and clamping strips for each block in length substantially equal to the width of the block secured to the inside of said band and extending transversely thereof, said blocks being connectible and disconnectible with respect to said band while the band is in position on the drum, by lateral movement of the block with respect to the band to connect and disconnect the dovetail grooves and dovetail strips with respect to each other, and means extending through said band for drawing the strips toward the band to clamp the overhanging sides of the dovetail grooves between the anchorage members and the band.

5. A clutch or brake construction comprising a friction element having a curved friction surface for frictionally engaging a cooperating relatively movable friction surface to check relative rotation between said surfaces about a common axis, an element carrier to which said friction element is secured, movable to bring said friction surfaces into and out of engagement with each other, means for detachably securing and clamping said element to said carrier comprising a guiding and clamping strip secured to said carrier extending longitudinally of the axis of rotation and adjustable clamping means for drawing said strip toward said carrier, said strip and element having interengaging guiding and clamping shoulders extending longitudinally of the axis of rotation for guiding said element axially in attaching and detaching it with respect to the strip and for drawing said element toward said carrier and clamping it thereon when the adjustable clamping means are operated to draw said strip toward said carrier, and abutment means engageable with the friction element for holding it against axial movement.

6. A clutch or brake construction comprising a friction element having a curved friction surface for frictionally engaging a cooperating relatively movable friction surface to check relative rotation between said surfaces about a common axis, an element carrier to which said friction element is secured, movable to bring said friction surfaces into and out of engagement with each other, and means for detachably securing and clamping said element to said carrier comprising a guiding and clamping strip secured to said carrier extending longitudinally of the axis of rotation, adjustable clamping means for drawing said strip toward said carrier, said strip and element having one or more interengaging guiding and clamping shoulders extending longitudinally of the axis of rotation for guiding said element axially attaching and detaching it with respect to the strip and for drawing said element toward said carrier and clamping it thereon when the adjustable clamping means are operated to draw said strip toward said carrier, and means for holding the friction element against axial movement comprising a second strip lying between said first strip and the friction element and having at least one of its ends bent to bear on the carrier and the friction element.

7. A clutch or brake construction comprising a friction element having a curved friction surface for frictionally engaging a co-operating relatively movable friction surface to check relative rotation between said surfaces about a common axis, an element carrier to which said friction element is secured, movable to bring said friction surfaces into and out of engagement with each other, and means for guiding said element in assembly and detachably securing and clamping said element to said carrier comprising a guiding and clamping strip in length substantially equal to the width of the element secured to said carrier extending longitudinally of the axis of rotation, and adjustable clamping means for drawing said strip toward said carrier, said strip and element having inter-engaging guiding and clamping shoulders extending longitudinally of the axis of rotation for guiding said element axially in attaching and detaching it with respect to the strip and for drawing said element toward said carrier and clamping it thereon when the adjustable clamping means are operated to draw said strip toward said carrier, said adjustable clamping means comprising a headed and threaded fastener extending through registering openings in said strip and carrier.

8. A clutch or brake construction comprising a friction element having a curved friction surface for frictionally engaging a co-operating relatively movable friction surface to check relative rotation between said surfaces about a common axis, an element carrier to which said friction element is secured, movable to bring said friction surfaces into and out of engagement with each other, and means for guiding said element in assembly and detachably securing and clamping said element to said carrier comprising a guiding and clamping strip in length substantially equal to the width of the element secured to said carrier extending longitudinally of the axis of rotation, and adjustable clamping means for drawing said strip toward said carrier, said strip and element having inter-engaging guiding and clamping shoulders extending longitudinally of the axis of rotation for guiding said element axially in attaching and detaching it with respect to the strip and for drawing said element toward said carrier and clamping it thereon when the adjustable clamping means are operated to draw said strip toward said carrier, said adjustable clamping means comprising a headed and threaded fastener extending through registering openings in said strip and carrier and said strip having a recess to receive the head of said fastener.

9. In a brake or clutch friction block having coaxial sectoral cylindrical face and back surfaces, said face surface being a friction surface for frictionally engaging a complementary relatively rotatable cylindrical friction surface to check relative rotation between said surfaces about a common axis, the back surface being for engagement with the cylindrical surface of a block carrier, said block having one or more dovetail grooves in its back carrier-engaging surface extending longitudinally of said axis and extending completely across said back surface for engaging and receiving a guiding and clamping strip on said carrier having uniformly sloping side edges, said dovetail groove having uniformly sloping sides engageable with the wedge-like sloping sides of said clamping strip throughout the length of the groove, the radial depth of the groove being somewhat greater than the radial height of said guiding and clamping strip whereby when the strip is drawn toward the carrier, the carrier-engaging back surface of the block will be clamped and wedged tightly against the carrier, leaving a substantial space between the carrier and the clamping strip.

10. In a brake or clutch friction block having coaxial sectoral cylindrical face and back surfaces, said face surface being a friction surface for frictionally engaging a complementary relatively rotatable cylindrical friction surface to check relative rotation between said surfaces about a common axis, the back surface being for engagement with the cylindrical surface of a block carrier, said block having one or more dovetail grooves in its back carrier-engaging surface extending longitudinally of said axis and extending completely across said back surface for engaging and receiving a guiding and clamping strip on said carrier having uniformly sloping side edges, said dovetail groove having uniformly sloping sides engageable with the wedge-like sloping sides of said clamping strip throughout the length of the groove, the radial depth of the groove being somewhat greater than the radial height of said guiding and clamping strip whereby when the strip is drawn toward the carrier, the carrier-engaging back surface of the block will be clamped and wedged tightly against the carrier, leaving a substantial space between the carrier and the clamping strip, the circumferentially spaced edges of both cylindrical surfaces lying substantially in the same radial axial planes, the carrier-engaging surface of the block being substantially equal to the friction surface of the element minus the planar area between the edges of the dovetail groove or grooves.

11. In a brake or clutch friction block having coaxial sectoral cylindrical face and back surfaces, said face surface being a friction surface for frictionally engaging a complementary relatively rotatable cylindrical friction surface to check relative rotation between said surfaces about a common axis, the back surface being for engagement with the cylindrical surface of a block carrier, said block having one or more dovetail grooves in its back carrier-engaging surface extending longitudinally of said axis and extending completely across said back surface for engaging and receiving a guiding and clamping strip on said carrier, said dovetail groove having shoulders engageable with the shoulders on said clamping strip throughout the length of the groove, the radial depth of the groove being somewhat greater than the radial height of said guiding and clamping strip whereby when the strip is drawn toward the carrier, the carrier-engaging back surface of the block will be clamped tightly against the carrier, leaving a substantial space between the carrier and the clamping strip.

12. In a brake or clutch friction block having coaxial sectoral cylindrical face and back surfaces, said face surface being a friction surface for frictionally engaging a complementary relatively rotatable cylindrical friction surface to check relative rotation between said surfaces about a common axis, the back surface being for engagement with the cylindrical surface of a block carrier, said block having one or more dovetail grooves in its back carrier-engaging surface extending longitudinally of said axis and extending completely across said back surface for engaging and receiving a guiding and clamping strip on said carrier, said dovetail groove having shoulders engageable with the shoulders on said clamping strip throughout the length of the groove, the radial depth of the groove being somewhat greater than the radial height of said guiding and clamping strip whereby when the strip is drawn toward the carrier, the carrier-engaging back surface of the block will be clamped tightly against the carrier, leaving a substantial space between the carrier and the clamping strip, the circumferentially spaced edges of both cylindrical surfaces lying substantially in the same radial axial planes, the carrier-engaging surface of the block being substantially equal to the friction surface of the element minus the planar area between the edges of the dovetail groove or grooves.

HANS R. AMUNDSEN.